US011158923B2

(12) United States Patent
Rusch et al.

(10) Patent No.: US 11,158,923 B2
(45) Date of Patent: Oct. 26, 2021

(54) DIELECTRIC WAVEGUIDE CONNECTOR ASSEMBLY COMPRISING A WAVEGUIDE FERRULE ENGAGED WITH A WAVEGUIDE SOCKET USING COMPLEMENTARY CODING MEMBERS

(71) Applicant: TE Connectivity Germany GmbH, Bensheim (DE)

(72) Inventors: Christian Rusch, Waldsee (DE); Carlos Almeida, Reinheim (DE); Günther Mumper, Egelsbach (DE); Stefan Glaser, Heppenheim (DE); Rolf Jetter, Darmstadt (DE); Jörg Bieber, Darmstadt (DE); Martin Seifert, Bensheim (DE); Wolfgang Müller, Darmstadt (DE); Andreas Engel, Frankisch-Crumbach (DE); Nhu Lam Nguyen, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/587,437

(22) Filed: Sep. 30, 2019

(65) Prior Publication Data
US 2020/0028229 A1 Jan. 23, 2020

Related U.S. Application Data

(63) Continuation of application No. PCT/EP2018/058324, filed on Mar. 30, 2018.

(30) Foreign Application Priority Data

Mar. 30, 2017 (EP) .................................. 17163967

(51) Int. Cl.
H01P 5/08 (2006.01)
G02B 6/38 (2006.01)
(Continued)

(52) U.S. Cl.
CPC ............ H01P 5/087 (2013.01); G02B 6/3812 (2013.01); G02B 6/3825 (2013.01); (Continued)

(58) Field of Classification Search
CPC .......... H01P 5/087; H01P 5/022; H01P 5/024; H01P 1/042; H01R 25/566
(Continued)

(56) References Cited

U.S. PATENT DOCUMENTS

| 5,148,593 A | 9/1992 | Walter |
| 5,666,449 A | 9/1997 | Sawae et al. |

(Continued)

FOREIGN PATENT DOCUMENTS

| CN | 2417488 Y | 1/2001 |
| CN | 2419608 Y | 2/2001 |

(Continued)

OTHER PUBLICATIONS

PCT Notification, The International Search Report and the Written Opinion of the International Searching Authority, dated May 4, 2018, 15 pages.

(Continued)

*Primary Examiner* — Benny T Lee
(74) *Attorney, Agent, or Firm* — Barley Snyder

(57) ABSTRACT

A microwave connector assembly comprises a waveguide ferrule having a receiving end receiving a dielectric waveguide, a connecting end distal to the receiving end, and a locking member, and a ferrule socket at least partially receiving the waveguide ferrule in a ferrule receptacle. The ferrule socket engages in a locking connection with the locking member. The ferrule socket has a coding member engaging a complementary coding member of the waveguide ferrule only when the waveguide ferrule is positioned relative to the ferrule socket in a single predetermined (Continued)

angular position or in one of two predetermined angular positions that are rotated by 180° with respect to each other.

16 Claims, 4 Drawing Sheets

(51) Int. Cl.
 *H01P 1/04* (2006.01)
 *H01P 11/00* (2006.01)
 *H01R 13/645* (2006.01)
(52) U.S. Cl.
 CPC ............ *G02B 6/3851* (2013.01); *H01P 1/042* (2013.01); *H01P 11/006* (2013.01); *H01R 13/6456* (2013.01)
(58) Field of Classification Search
 USPC .................................. 333/254, 24 R
 See application file for complete search history.

(56) References Cited

U.S. PATENT DOCUMENTS

| | | | |
|---|---|---|---|
| 9,490,518 B1 | 11/2016 | Herbsommer et al. | |
| 9,692,102 B2* | 6/2017 | Herbsommer et al. ... | H01P 3/16 |
| 10,761,274 B2 | 9/2020 | Pepe et al. | |
| 2005/0285702 A1 | 12/2005 | Graczyk et al. | |
| 2014/0184351 A1 | 7/2014 | Bae et al. | |
| 2014/0285294 A1* | 9/2014 | Haroun et al. .......... | H01P 3/165 |
| | | | 333/256 |
| 2015/0372388 A1 | 12/2015 | Martineau et al. | |
| 2016/0036114 A1* | 2/2016 | Okada ..................... | H02J 5/005 |
| | | | 307/104 |
| 2016/0204495 A1 | 7/2016 | Takeda et al. | |
| 2017/0093009 A1 | 3/2017 | Herbsommer et al. | |

FOREIGN PATENT DOCUMENTS

| | | |
|---|---|---|
| CN | 104603656 A | 5/2015 |
| EP | 0128686 A1 | 12/1984 |
| EP | 1394584 A2 | 3/2004 |
| EP | 1394584 A3 | 7/2004 |
| JP | 09222533 | 8/1997 |

OTHER PUBLICATIONS

European Patent Office Communication, dated Apr. 22, 2020, 4 pages.
Office Action from the Japanese Patent Office in Appln. No. 2019-553047, dated Nov. 4, 2020, and English translation thereof, 6 pp.
Abstract of JP2015177499, dated Oct. 5, 2015, 2 pp.
First Office Action from CNIPA dated Feb. 1, 2021 and English translation thereof, 20 pp.

\* cited by examiner

DIELECTRIC WAVEGUIDE CONNECTOR ASSEMBLY COMPRISING A WAVEGUIDE FERRULE ENGAGED WITH A WAVEGUIDE SOCKET USING COMPLEMENTARY CODING MEMBERS

CROSS-REFERENCE TO RELATED APPLICATIONS

This application is a continuation of PCT International Application No. PCT/EP2018/058324, filed on Mar. 30, 2018, which claims priority under 35 U.S.C. § 119 to European Patent Application No. 17163967.7, filed on Mar. 30, 2017.

FIELD OF THE INVENTION

The present invention relates to a connector assembly and, more particularly, to a microwave connector assembly.

BACKGROUND

Dielectric waveguides may be used to transmit millimeter waves, also referred to as microwaves, in communication links with high data rates. If the dielectric waveguide has a rectangular core, the direction of the linear polarized waveguide mode guided within the waveguide is defined by the shape of the core, in contrast to a circular core which guides polarized microwaves without predominant direction. Known polarization-maintaining waveguides, however, are difficult to handle.

SUMMARY

A microwave connector assembly comprises a waveguide ferrule having a receiving end receiving a dielectric waveguide, a connecting end distal to the receiving end, and a locking member, and a ferrule socket at least partially receiving the waveguide ferrule in a ferrule receptacle. The ferrule socket engages in a locking connection with the locking member. The ferrule socket has a coding member engaging a complementary coding member of the waveguide ferrule only when the waveguide ferrule is positioned relative to the ferrule socket in a single predetermined angular position or in one of two predetermined angular positions that are rotated by 180° with respect to each other.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
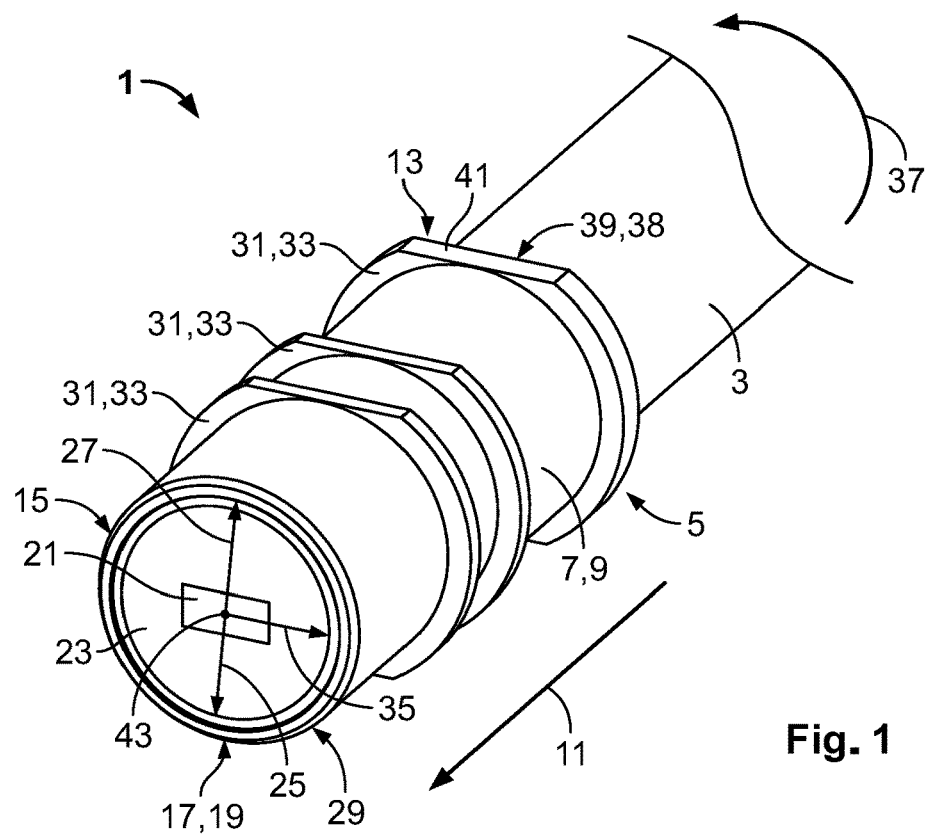
FIG. 1 is a perspective view of a waveguide assembly according to an embodiment.

The present invention will be described in greater detail by way of example using several embodiments with reference to the appended drawings. The embodiments merely represent possible configurations in which individual features can be realized and omitted independently of each other. In the description of the embodiments, the same technical features and technical features having the same effect are provided with the same reference numerals.

A waveguide assembly 1 according to an embodiment, as shown in FIG. 1, comprises a dielectric waveguide 3 which is inserted into a waveguide ferrule 5. The waveguide ferrule 5 includes a waveguide ferrule base 7 which is embodied as a hollow shape depending on the waveguide 3 outer shape and extends along a longitudinal direction 11. In the shown embodiment, the waveguide ferrule base 7 is a cylinder 9.

The waveguide ferrule 5, as shown in FIG. 1, has a receiving end 13 receiving the dielectric waveguide 3 along the longitudinal direction 11. Distal to the receiving end 13, the waveguide ferrule 5 has a connecting end 15. A waveguide end 17, a facet 19 of the dielectric waveguide 3, extends to the connecting end 15 of the waveguide ferrule 5 in the embodiment of the waveguide assembly 1 shown in FIG. 1. The waveguide end 17 is the portion of the waveguide 3 prepared for coupling microwave radiation into the waveguide 3 or for coupling microwave radiation out of the waveguide 3. The waveguide end 17 may be obtained by splicing the waveguide 3, wherein during the splicing the clean-cut end face or facet 19 is obtained at the waveguide end 17.

At the facet 19 of the dielectric waveguide 3, the structure of the dielectric waveguide 3 is visible, as shown in FIG. 1. A waveguide core 21 of a rectangular shape is surrounded by a cladding 23 which has essentially a circular outer shape. In other embodiments, the shape can also vary, and may be a square, or the like.

The waveguide ferrule base 7, as shown in FIG. 1, has an inner free diameter 25 and the dielectric waveguide 3 has an outer diameter 27. In embodiments with different shapes, such as square or rectangular, dimensions of the waveguide ferrule base 7 and the dielectric waveguide 3 are given by one or more straight lengths such as width and height. In FIG. 1, the inner free diameter 25 and the outer diameter 27 are indicated with one double-headed arrow, wherein the inner free diameter 25 may be embodied slightly smaller than the outer diameter 27, such that the dielectric waveguide 3 is held within the waveguide ferrule 5 by a frictional fit 29. Different connections between the dielectric waveguide 3 and the waveguide ferrule 5 are known in the art and not shown in the figures.

The waveguide ferrule 5, as shown in FIG. 1, further comprises three locking members 31 which are embodied as collars 33 which extend from the waveguide ferrule base 7 in a radial direction 35 and at least partially around the waveguide ferrule base 7 in a circumferential direction 37. The collar 33 may be attached to the waveguide ferrule base 7 in a monolithic or a two-piece manner by appropriate attachments, such as welding, soldering or the like. The locking members 31 shown in FIG. 1 do not entirely extend around the waveguide ferrule base 7, but include a complementary coding member 38 which is embodied as a coding recess 39. The coding recess 39 is further embodied as a flattened portion 41. For the sake of visibility, only one coding recess 39 embodied as flattened portion is provided with a reference numeral in FIG. 1.

The radial direction 35 shown in FIG. 1 is only one representative of a multitude of possible radial directions 35 which extend from a center 43 of the waveguide ferrule 5 towards the waveguide ferrule base 7. The flattened portion 41 of the locking members 31 is flattened in a direction opposite the radial direction 35. The embodiments shown in FIGS. 1 and 2 have a fiber ferrule 5 with one single coding recess, wherein in different embodiments, a second coding recess may be provided which is located at a radially opposing side of the waveguide ferrule base 7.

Figure 2:
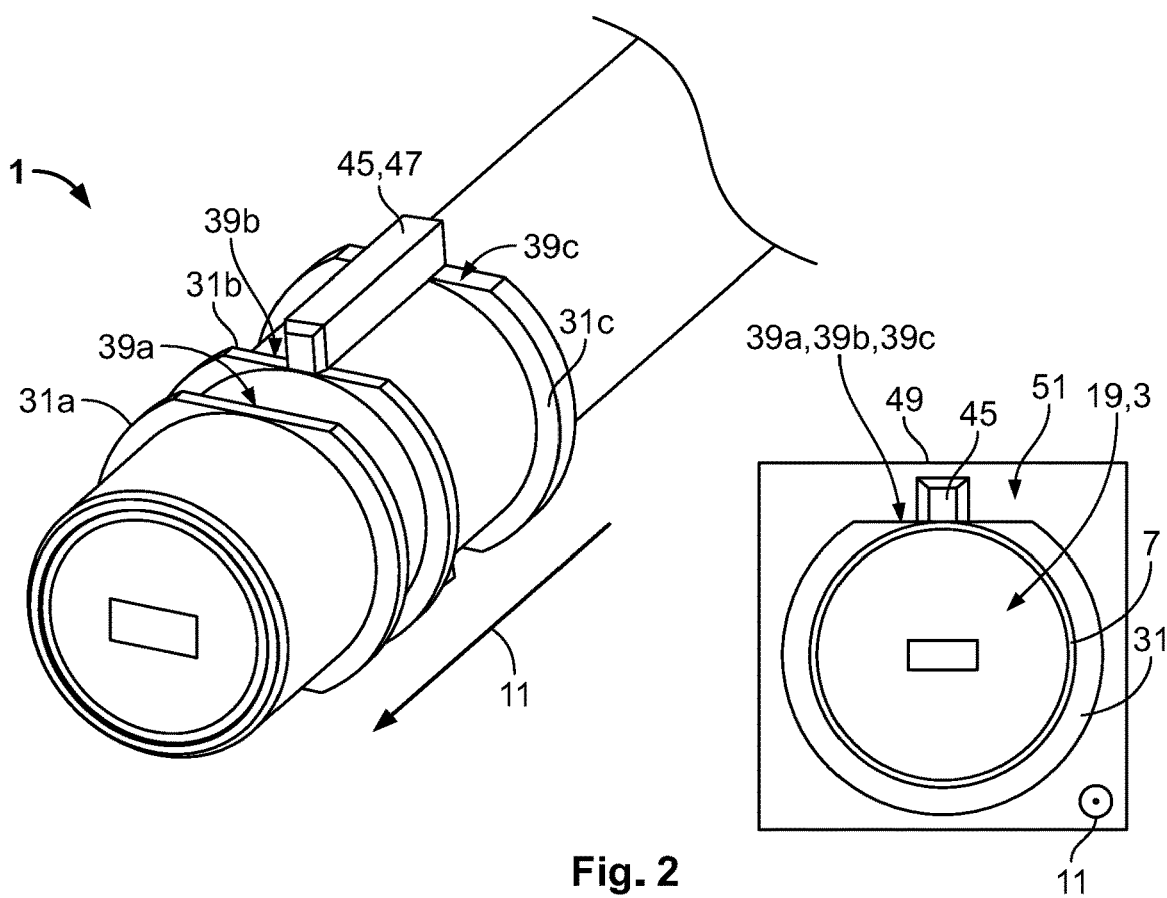
FIG. 2 is a perspective view of a waveguide assembly according to another embodiment.

A waveguide assembly 1 according to another embodiment, shown in FIG. 2, includes a coding member 45 which is embodied as a fin 47. The coding member 45 is located within a second coding recess 39b and within a third coding recess 39c, but is spaced apart from a first coding recess 39a by a distance in a direction opposite the longitudinal direction 11.

A projection 51 along the cylindrical waveguide ferrule 5, i.e. in a direction opposite to the longitudinal direction 11, is shown in a section 49 in FIG. 2. The projection 51 shows the facet 19 of the dielectric waveguide 3, the waveguide ferrule base 7 and the locking member 31. In the projection 51 only a first locking member 31a is visible, wherein the second 31b and third locking member 31c are covered by the first locking member 31a. The first, second and third coding recess 39a, 39b, 39c are arranged behind each other, such that the coding member 45 is located within all coding recesses 39a-39c in the projection 51.

Figure 3:
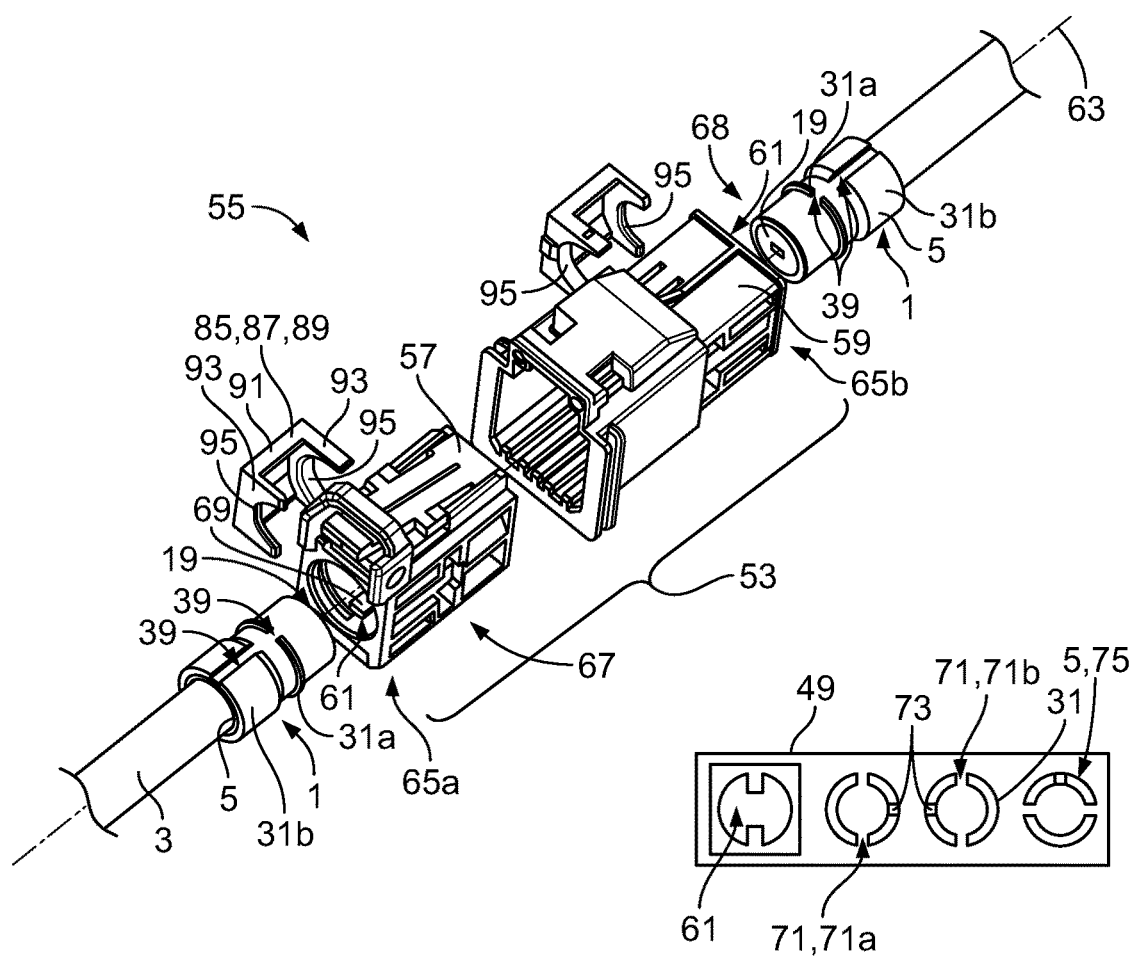
FIG. 3 is an exploded perspective view of a microwave connector assembly according to an embodiment.

A microwave connector assembly 55 according to an embodiment, as shown in FIG. 3, comprises two waveguide assemblies 1 and a ferrule socket 53. The ferrule socket 53 includes an inner member 57 and an outer member 59, wherein the inner member 57 may be inserted into the outer member 59. The microwave connector assembly 55 comprises two ferrule receptacles 61, into which the waveguide ferrule 5 of the respective waveguide assemblies 1 may be inserted.

The waveguide assembly 1 and the ferrule socket 53 are arranged linearly along a waveguide axis 63, as shown in FIG. 3. The waveguide assemblies 1 are arranged on opposite sides 65a and 65b of the ferrule socket 53 and face each other with their respective facets 19.

The waveguide ferrules 5 shown in FIG. 3 are embodied according to a second embodiment of the inventive waveguide ferrule and are distinct from the waveguide ferrules 5 shown in FIGS. 1 and 2. The waveguide ferrules 5 shown in FIG. 3 only include a first locking member 31a and a second locking member 31b, with the second locking member 31b having a larger dimension along a direction parallel to the waveguide axis 63 than the first locking member 31a. The waveguide ferrules 5 of FIG. 3 each have four coding recesses 39, two of them being located below each of the corresponding waveguide ferrules 5. Overall, four coding recesses 39 are hidden in the view of FIG. 3.

Receiving the waveguide ferrule 5 within the ferrule receptacle 61 is similar for both of the shown waveguide ferrules 5, therefore the following description refers to a first connection region 67, the principles of which may be applicable to a second connection region 68 shown in FIG. 3. Within the ferrule receptacle 61, a coding member 69 is visible that extends inside the ferrule receptacle 61. On the opposite side of the ferrule receptacle 61, a second coding member 69 extends into the ferrule receptacle 61 in a direction opposite to the first coding member 69 shown in FIG. 3. The connecting ends of the two waveguide ferrules 5 are positioned in the corresponding ferrule receptacles 61 and are separated apart from each other by a distance that is less than one wavelength of the microwave radiation. The two waveguide ferrules 5 may be positioned less than half a wavelength, less than a quarter wavelength, and even more less than one tenth of one wavelength of the microwave radiation apart from each other.

If the waveguide assembly 1 of the first connection region 67 is inserted into the inner member 57, there are basically two predetermined angular positions of the waveguide ferrule 5 with respect to the ferrule receptacle 61 in which the coding members 69 of the ferrule receptacle 61 are received within the coding recesses 39 of the waveguide ferrule 5. The predetermined angular positions 71 are indicated in the schematic 49 of FIG. 3. In order to distinguish a first predetermined angular position 71a and a second predetermined angular position 71b, rotated by 180° with respect to each other, an indicator mark 73 is provided at the locking members 31 just for this explanation. The engagement of the coding member 69 with the coding recess 39 allows the waveguide ferrule 5 to be reliably, reproducibly and easily rotated into a predetermined angular position in which two dielectric microwave waveguides 3 or a microwave waveguide 3 and a ferrule socket 53 may be coupled to each other with minimized coupling losses.

In an embodiment, a polarization-maintaining connection between two polarization-maintaining components has exactly two predetermined angular positions in which coupling losses are minimized. The polarization-maintaining components may, for instance, be two polarization-maintaining dielectric waveguides 3 or a dielectric waveguide 3 and a ferrule socket 53.

As shown in FIG. 3, if the waveguide ferrule 5 is positioned in an arbitrary angular position 75, the coding member 69 of the ferrule receptacle 61 abuts the first locking member 31a during an attempt to insert the waveguide ferrule 5 into the ferrule receptacle 61. In such an arbitrary angular position 75 of the waveguide ferrule 5, further insertion and locking between the waveguide ferrule 5 and the ferrule socket 53 is not possible.

In an embodiment, the microwave connector assembly 55 may have more than two coding recesses 39 and coding members 69, wherein such an embodiment has an even number of coding recesses 39 and coding members 69 resulting in a rotational symmetry of two. Such a microwave connector assembly 55 may have a non-equal angular spacing between the coding members 69 and coding recesses 39.

Figure 4:
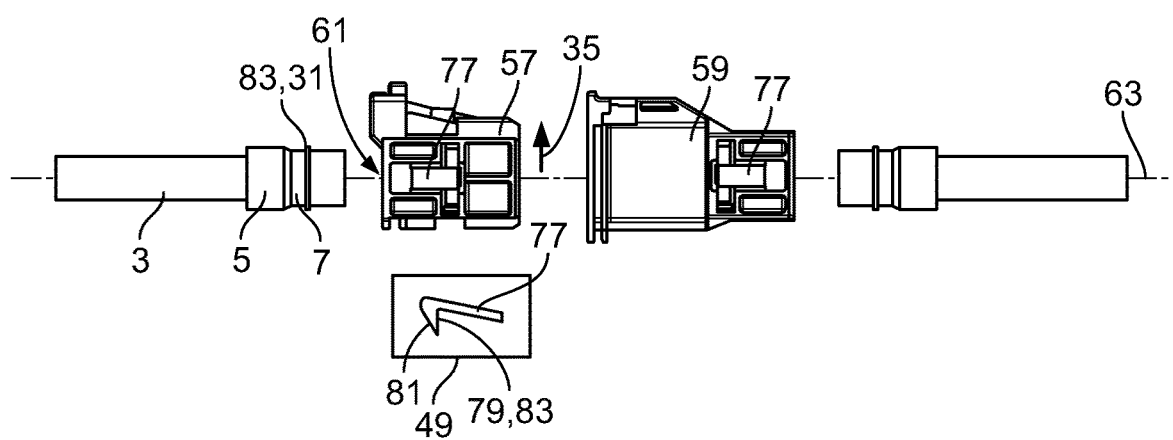
FIG. 4 is a side view of the microwave connector assembly of FIG. 3.
Figure 6:
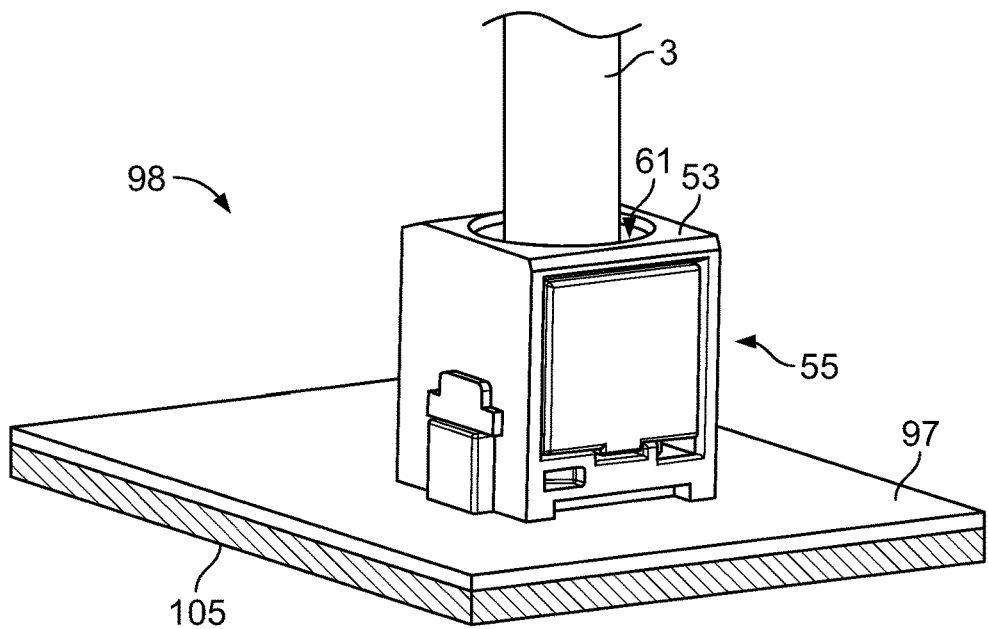
FIG. 6 is a perspective view of a microwave transmission assembly according to another embodiment.
Figure 7:
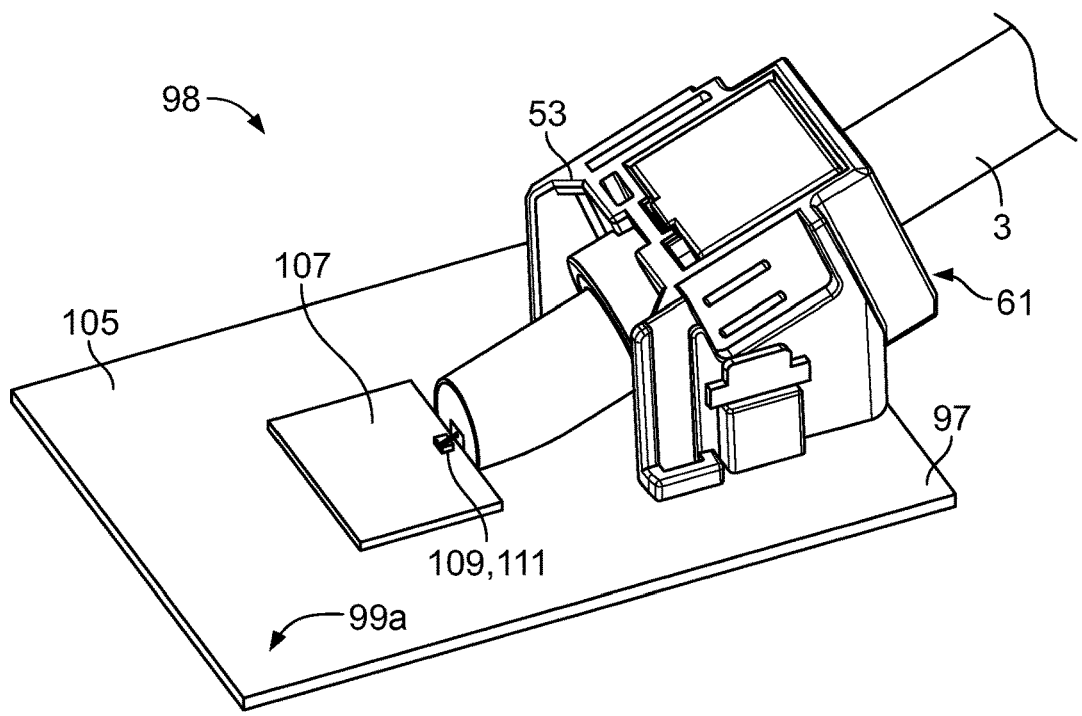
FIG. 7 is a perspective view of a microwave transmission assembly according to another embodiment.
Figure 7:
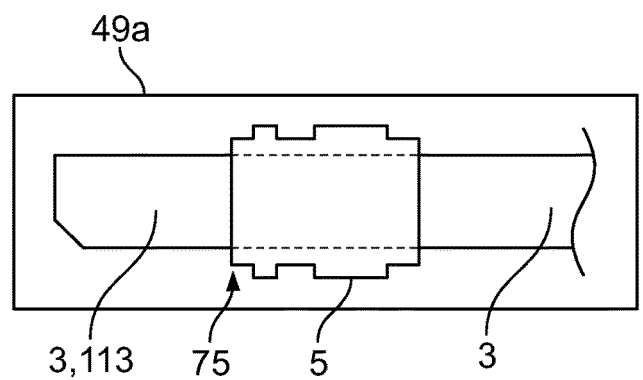
Figure 7:
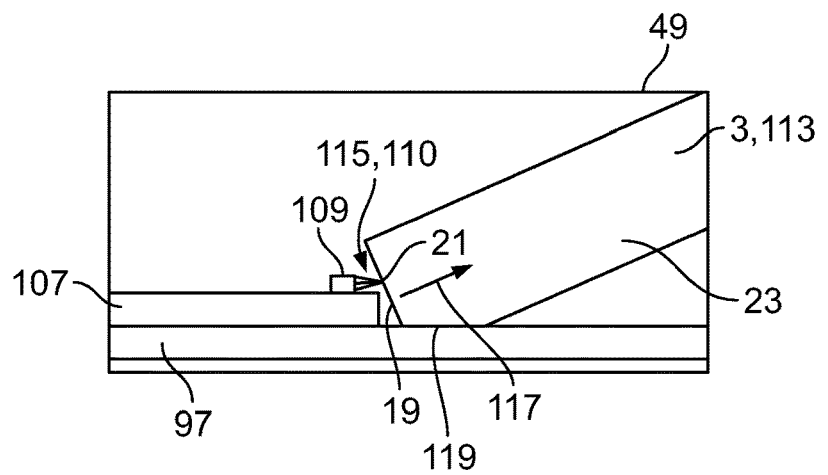

As shown in FIG. 4, a resilient arm 77 is embodied at the inner member 57 as well as at the outer member 59, wherein each of the resilient arms 77 has a counter locking member 79, shown in the schematic 49 for a partially drawn and isolated resilient arm 77. Upon receipt of the waveguide ferrule 5 within the ferrule receptacle 61, the resilient arm 77 abuts the locking member 31 with a ramp 81 of the resilient arm 77 sloping with respect to the waveguide axis 63 and deflects the resilient arms 77 away from the waveguide ferrule 5 in the radial direction 35. The locking member 31 slides along the ramp 81 until a final position, shown in FIGS. 6 and 7, is reached. In the final position, the counter locking member 79 latches behind the locking member 31. In the final position, the resilient arm 77 relaxes back to the state shown in FIG. 4.

The locking member 31 and the resilient arm 77 with its the counter locking member 79 of the resilient arm 77 form a primary lock 83, shown in FIG. 4, that prevents unintentional removal of the waveguide ferrule 5 from the ferrule receptacle 61. The primary lock 83 may be further supported by a secondary lock 85 shown in FIG. 3; the secondary lock 85 is formed by a retainer 87. In an embodiment, the primary lock 83 is formed only if the waveguide ferrule 5 is received in the ferrule socket 53 in a predetermined angular position.

The retainer 87, as shown in FIG. 3, is a substantially U-shaped part 89 with a base 91 and two secondary locking members 93 that extend substantially perpendicular from the base 91. The secondary locking members 93 each have an arc-shaped abutment front 95, which, when the retainer 87 is inserted into the inner member 57 or the outer member 59 in a direction opposite the radial direction 35 through an opening of the ferrule socket 53, abut the waveguide ferrule base 7 (FIG. 4) or the dielectric waveguide 3 next to the locking members 31 (FIG. 4). The arc-shaped abutment fronts 95 also prevents a relative movement between the waveguide ferrule 5 and the ferrule receptacle 61, as the retainers 87 also abut the inner member 57 or the outer member 59. In an embodiment, the secondary locking members 93 may be collar-like locking members.

The outer diameter 27 (FIG. 1) of the waveguide ferrule 5 may be defined at a position at which the locking member 31 is located. The waveguide ferrule base 7, which has a smaller outer diameter than the portion with the locking member 31, as well as the portion with the locking member 31, may be received within the ferrule receptacle 61 with a sufficiently small play. A sufficiently small play is to be understood as the allowable tolerances in the positioning between the waveguide ferrule 5 and the ferrule socket 53, within which coupling losses are avoided. Depending on the wavelength of the microwaves used, the tolerances are different for different applications.

Figure 5:
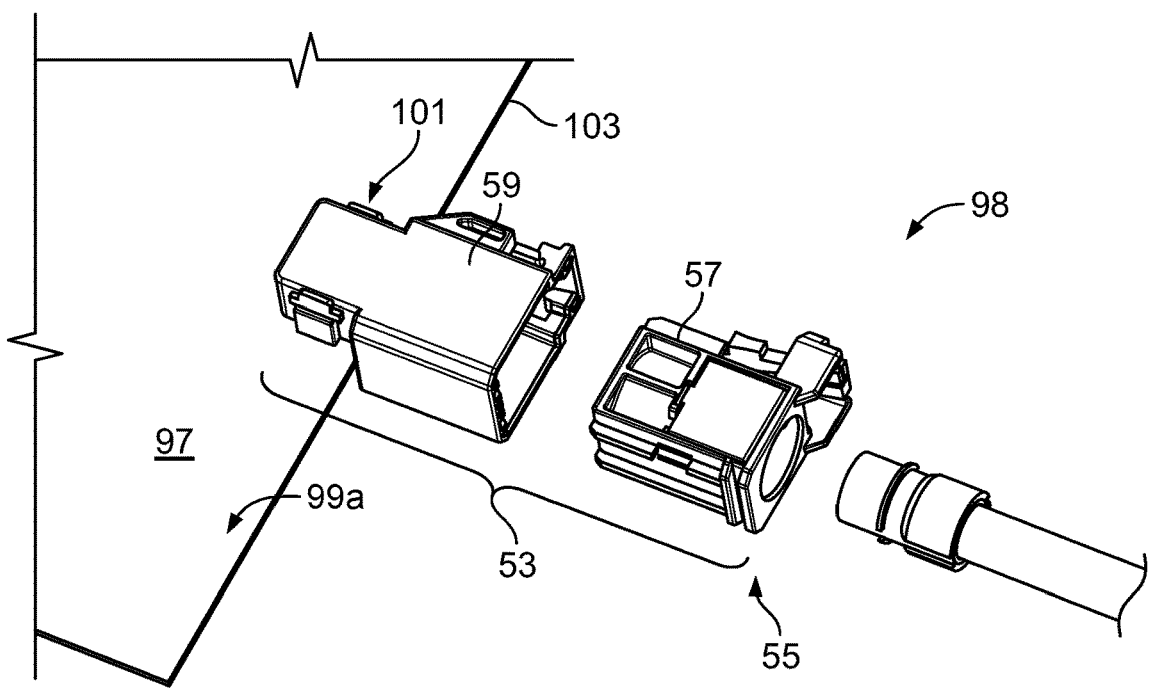
FIG. 5 is an exploded perspective view of a microwave transmission assembly according to an embodiment.

The microwave connector assembly 55 incorporated into a microwave transmission assembly 98 is shown in FIG. 5. The microwave transmission assembly 98 includes a circuit board 97. An outer member 59, that forms part of the ferrule socket 53, is attached to a flat side 99a of the circuit board 97 and an attachment section 101. The ferrule socket 53 extends over an edge 103 of the circuit board 97. The inner member 57 shown in FIG. 5 corresponds to the inner member 57 of FIGS. 3 and 4, wherein the outer member 59 is embodied differently in FIG. 5.

A microwave transmission assembly 98 according to another embodiment, as shown in FIG. 6, has the dielectric waveguide 3 oriented essentially perpendicular to the circuit board 97. The dielectric waveguide 3 is inserted into a waveguide ferrule 5, not visible in FIG. 6, which is received in the ferrule receptacle 61 of the ferrule socket 53. The facet 19 (i.e. not visible in FIG. 6) of the dielectric waveguide 3 is therefore oriented essentially parallel to the circuit board 97. In the embodiment shown in FIG. 6, the ferrule socket 53 and the dielectric waveguide 3 extend away from the circuit board 97 and are located within a footprint 105 of the circuit board 97. The footprint 105 is to be understood as an area covered by the circuit board 97.

In an embodiment, the electric assemblies 98 of FIGS. 5 and 6 comprise a microwave emitter 107 (not visible in FIGS. 5 and 6). The microwave emitter 107 is shown in another embodiment of the microwave transmission assembly 98 in FIG. 7.

The microwave emitter 107, as shown in FIG. 7 and indicated by a cuboid volume, includes an antenna 109 which is also only schematically indicated by a cuboid. The antenna 109 may be embodied in different ways and may, for instance, be an end-fire antenna, such as a Vivaldi antenna 111, or broadside radiating antenna, such as a patch, that simulates a linearly polarized microwave.

In the view 49 of FIG. 7, a side view of the circuit board 97, the microwave emitter 107 and the antenna 109, as well as the dielectric waveguide 3 are shown. The dielectric waveguide 3 shown in FIG. 7 is referred to as excess end 113; a portion of the waveguide 3 extending beyond the waveguide ferrule 5. From the antenna 109, microwave radiation 115 is emitted towards the facet 19 of the excess end 113 and coupled into the waveguide core 21. An emission direction 117 is essentially parallel to the orientation of the excess end 113. The microwave radiation 115 has a specific radiation pattern 110 depending on the antenna 109 used. The microwave radiation 115 may be transmitted through an opening in the ferrule socket 53 to the ferrule receptacle 61 (FIG. 6).

The radiation pattern 110 may have a main lobe of radiation, wherein the antenna 109 is positioned such that the main lobe of radiation is directed towards the dielectric waveguide 3, such that the microwaves may be coupled into the dielectric waveguide 3. The radiation pattern of the microwave antenna 109 may also be referred to as far-field or antenna pattern. In an embodiment, the microwave emitter 107 and its antenna 109 are oriented such that a main lobe of the microwave radiation is emitted in a direction slanted or perpendicular to the circuit board 97. Accordingly, the ferrule receptacle 61 (FIG. 6) and the waveguide ferrule 5 received within the ferrule receptacle 61 (FIG. 6) are oriented essentially along the same direction as the main lobe of the emitted microwave radiation.

In order to allow an assembly of the excess end 113 close to the circuit board 97, the cladding 23 of the excess end 113 is partially cut to form a chamfer 119, as shown in FIG. 7. The chamfer 119 abuts the circuit board 97.

In the embodiment of the microwave transmission assembly 98 shown in FIG. 7, the ferrule socket 53 is completely located within the footprint 105 and on the flat side 99a (FIG. 5) of the circuit board 97. The dielectric waveguide 3 received within the ferrule socket 53 extends through a waveguide ferrule 5 which allows for providing a predetermined angular position of the waveguide ferrule 5 with respect to the ferrule socket 53. A view 49a schematically shows the dielectric waveguide 3, the waveguide ferrule 5 and the excess end 113 of FIG. 7 without the ferrule socket 53. The dashed lines indicate that the dielectric waveguide 3 extends through the waveguide ferrule 5, in particular beyond the connecting end 15.

What is claimed is:

1. A microwave connector assembly, comprising:
   a waveguide ferrule having a receiving end receiving a dielectric waveguide, a connecting end distal to the receiving end, and a locking member; and
   a ferrule socket at least partially receiving the waveguide ferrule in a ferrule receptacle, the ferrule socket engaging in a locking connection with the locking member, the ferrule socket having a coding member engaging a complementary coding member of the waveguide ferrule only when the waveguide ferrule is positioned relative to the ferrule socket in a single predetermined angular position or in one of two predetermined angular positions that are rotated by 180° with respect to each other, the complementary coding member is a flattened portion or a coding recess.

2. The microwave connector assembly of claim 1, wherein the ferrule socket has a pair of ferrule receptacles that includes the ferrule receptacle and the pair of ferrule receptacles are positioned opposite each other.

3. The microwave connector assembly of claim 2, wherein the waveguide ferrule is one of a pair of waveguide ferrules, a pair of connecting ends of the pair of waveguide ferrules are positioned in the pair of ferrule receptacles and are spaced apart from each other less than one wavelength of microwave radiation.

4. The microwave connector assembly of claim 1, wherein a pair of complementary coding members that includes the complementary coding member are located at radially opposite sides of a waveguide ferrule base of the waveguide ferrule.

5. The microwave connector assembly of claim 4, wherein a pair of coding members that includes the coding member are located at radially opposite sides of the ferrule receptacle.

6. The microwave connector assembly of claim 1, wherein a pair of coding members that includes the coding member are located at radially opposite sides of the ferrule receptacle.

7. The microwave connector assembly of claim 1, wherein the flattened portion is flattened in a direction opposite a radial direction of the waveguide ferrule.

8. The microwave connector assembly of claim 1, wherein the waveguide ferrule has a fin located within the coding recess of the complementary coding member.

9. The microwave connector assembly of claim 1, wherein the dielectric waveguide has a free end extending beyond the waveguide ferrule.

10. The microwave connector assembly of claim 1, further comprising a retainer insertable into the ferrule socket.

11. The microwave connector assembly of claim 10, wherein the retainer has a secondary locking member engaging the locking member and preventing the waveguide ferrule from being removed from the ferrule socket.

12. A microwave transmission assembly, comprising:
a dielectric waveguide having a waveguide end;
a microwave connector assembly including a waveguide ferrule having a receiving end receiving the dielectric waveguide, a connecting end distal to the receiving end, and a locking member, and a ferrule socket at least partially receiving the waveguide ferrule in a ferrule receptacle, the ferrule socket engaging in a locking connection with the locking member, the ferrule socket having a coding member engaging a complementary coding member of the waveguide ferrule only when the waveguide ferrule is positioned relative to the ferrule socket in a single predetermined angular position or in one of two predetermined angular positions that are rotated by 180° with respect to each other, the complementary coding member is a flattened portion or a coding recess; and
a microwave emitter disposed on a flat side of a circuit board, the microwave emitter has a microwave antenna with a radiation pattern that is at least partially directed towards the waveguide end, the waveguide end is located on the flat side of the circuit board.

13. The microwave transmission assembly of claim 12, wherein the ferrule socket is disposed within a footprint of the circuit board.

14. The microwave transmission assembly of claim 13, wherein the dielectric waveguide is oriented slanted or perpendicular with respect to the flat side of the circuit board.

15. The microwave transmission assembly of claim 12, wherein the ferrule socket is fastened to the flat side of the circuit board.

16. The microwave transmission assembly of claim 12, wherein the waveguide end extends out of the ferrule socket.

* * * * *